United States Patent [19]

Iguchi et al.

[11] Patent Number: 5,307,297
[45] Date of Patent: Apr. 26, 1994

[54] DATA PROCESSOR WITH WIRELESS AUXILIARY INPUT APPARATUS

[75] Inventors: Shigeki Iguchi, Nara; Yukihiko Ueno, Souraku; Seiichi Senoo, Shiki; Tomoyuki Yano, Yamatokoriyama; Tokuyuki Shirasuka, Nara; Akira Mitarai; Yoshitaka Fukuma, both of Yamatokoriyama; Yoshito Kataoka, Ikoma; Hirofumi Nishikawa, Yao; Yasumasa Yamanaka; Yoshiki Oka, both of Yamatokoriyama; Masashi Hara; Masaharu Satoh, both of Nara, all of Japan

[73] Assignee: Sharp Kabushiki Kaisha, Osaka, Japan

[21] Appl. No.: 878,604

[22] Filed: May 5, 1992

[30] Foreign Application Priority Data

May 10, 1991 [JP] Japan ................... 3-106039

[51] Int. Cl.⁵ .............................................. G06F 1/00
[52] U.S. Cl. ................................. 364/708.1; 345/169
[58] Field of Search .............. 364/708, 709.11, 709.12, 364/709.01; 340/706, 711

[56] References Cited

U.S. PATENT DOCUMENTS

| | | | |
|---|---|---|---|
| 4,773,032 | 9/1988 | Uehara et al. | 364/709.12 X |
| 4,916,441 | 4/1990 | Gombrich | 364/709.11 X |
| 5,049,863 | 9/1991 | Oka | 364/709.01 X |

FOREIGN PATENT DOCUMENTS

| | | |
|---|---|---|
| 61-9717 | of 1986 | Japan . |
| 61-103229 | of 1986 | Japan . |
| 61-103230 | of 1986 | Japan . |
| 62-168218 | of 1987 | Japan . |

Primary Examiner—Tan V. Mai
Attorney, Agent, or Firm—Nixon & Vanderhye

[57] ABSTRACT

In a data processor having a box type unit in which a keyboard and a folding display are incorporated, the data processor includes a main unit which has a receiver for wireless signals on an external side wall close to a supporter for pivotally supporting the folding display, and an auxiliary input apparatus having a case unit and a wireless signal transmitting unit at a corner of said case unit which is opposed to the receiving unit of said main unit when juxtaposed with said keyboard.

12 Claims, 16 Drawing Sheets

FIG. 2

|   |   |   |      | RELEASE | RUN  |
|---|---|---|------|---------|------|
|   |   |   |      | FUNCTION |     |
| 7 | 8 | 9 | FUNC | RELE | RUN |
| 4 | 5 | 6 | ×    | −    | ÷   |
| 1 | 2 | 3 | +    | ↑    | RET — RETURN |
| 0 | , | . | ←    | ↓    | →   |

FIG. 3

| | UNDERLINE | DOUBLE-WIDE CHARACTERS | | | |
|---|---|---|---|---|---|
| BEG DOC | − | SPACE | | | |
| PRINT | ← | DOUB | FORMAT | ERASE | ⊂ |
| MOVE | COPY | END DOC | RULER | ⇧ | ↵  — PAGE BREAK |
| BLOCK | HALF | FULL | ⇐ | ⇩ | ⇒ |

JUMP TO THE TOP OF DOCUMENT

BACKSPACE

JUMP TO THE END OF DOCUMENT

CHANGING TO HALF-WIDE CHARACTERS

CHANGING TO FULL-WIDE CHARACTERS

RULER LINE

FIG. 8

| L\H | 0 | 1 | 2 | 3 | 4 | 5 | 6 | 7 |
|---|---|---|---|---|---|---|---|---|
| 0 |  | ↑ | 5 |  |  |  |  | FUNC ← FUNCTION |
| 1 | *1 | ↓ | 6 |  |  |  |  |  |
| 2 |  | ← | 1 |  |  |  |  |  |
| 3 |  | → | 2 |  |  |  |  |  |
| 4 | *2 |  | 3 |  |  |  |  |  |
| 5 | *3 |  | 0 |  |  |  |  | × |
| 6 |  |  | , |  |  |  |  | ÷ |
| 7 |  |  | . |  |  |  |  | + |
| 8 | *4 |  |  |  |  |  |  | − |
| 9 |  |  |  |  |  |  |  |  |
| A |  |  |  |  |  |  |  |  |
| B |  |  |  |  |  |  |  |  |
| C |  | 7 |  |  |  |  |  |  |
| D |  | 8 |  |  |  |  |  | RELE ← RELEASE |
| E |  | 9 |  |  |  |  |  |  |
| F |  | 4 | RUN |  |  |  |  | RET ← RETURN |

[ ↑ ] ← KEY TOP REPRESENTATIVE LETTER

*1−*4 ARE CODES ALLOCATED TO CATERCORNER CURSOR

*1 ( UP RIGHT   ) ↑ + → = 01H
*2 ( DOWN RIGHT) ↓ + → = 04H
*3 ( UP LEFT    ) ↑ + → = 05H
*4 ( DOWN LEFT  ) ↓ + → = 08H

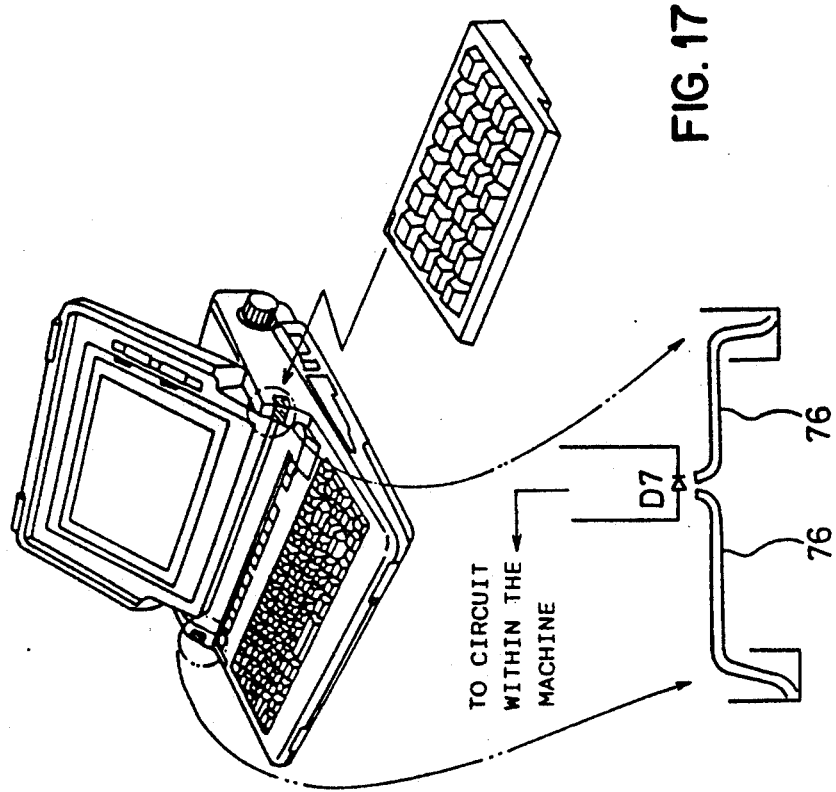
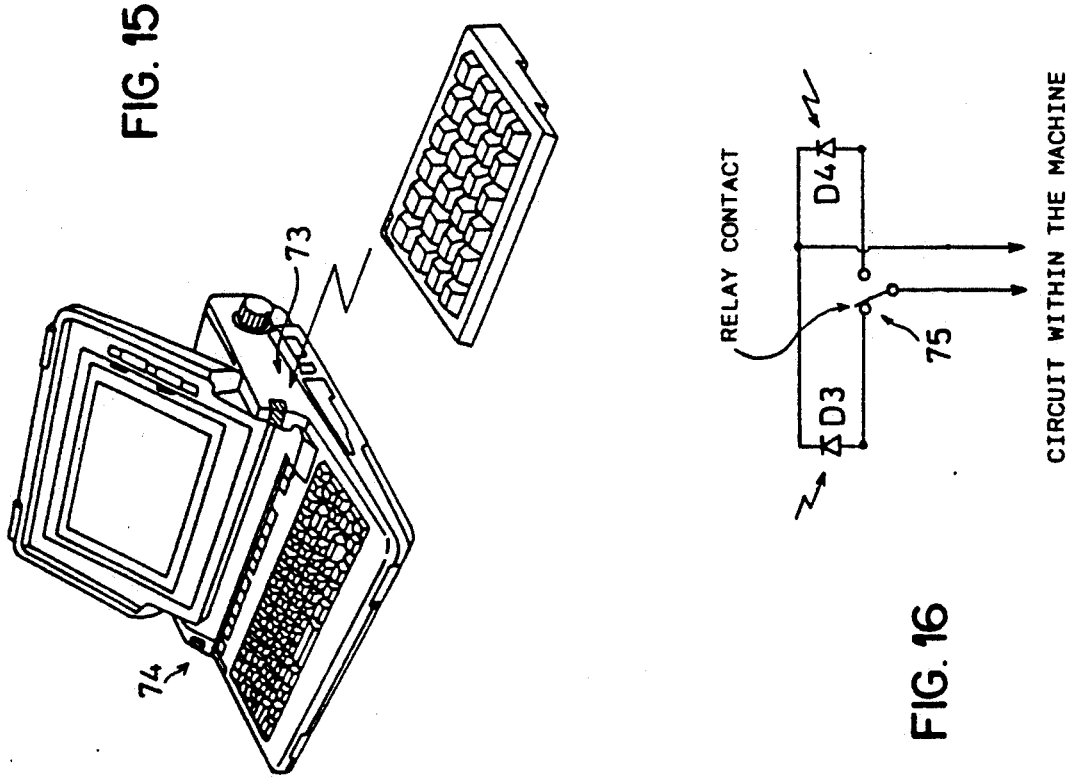

FIG. 20
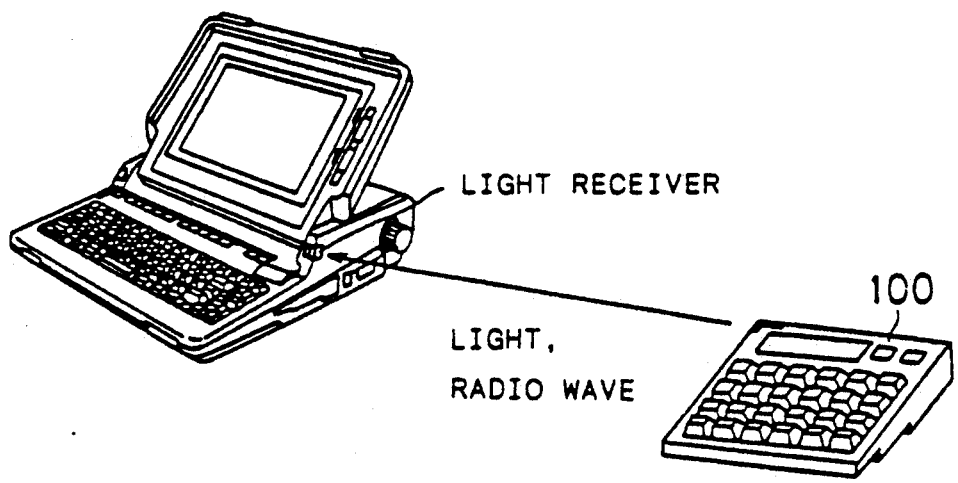
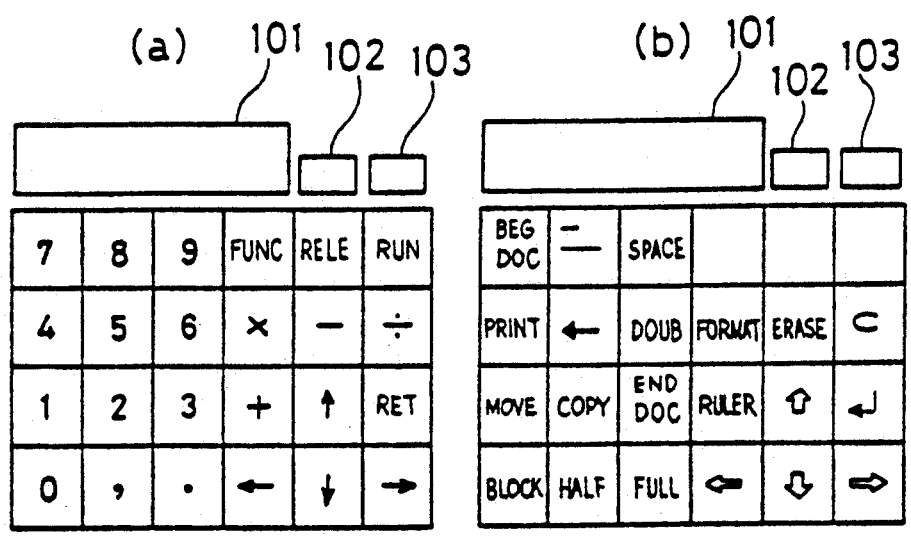
FIG. 21

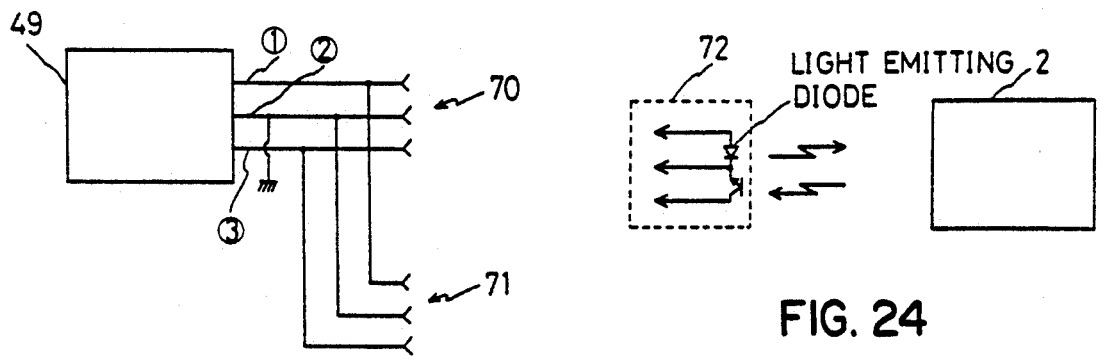
FIG. 23
FIG. 24
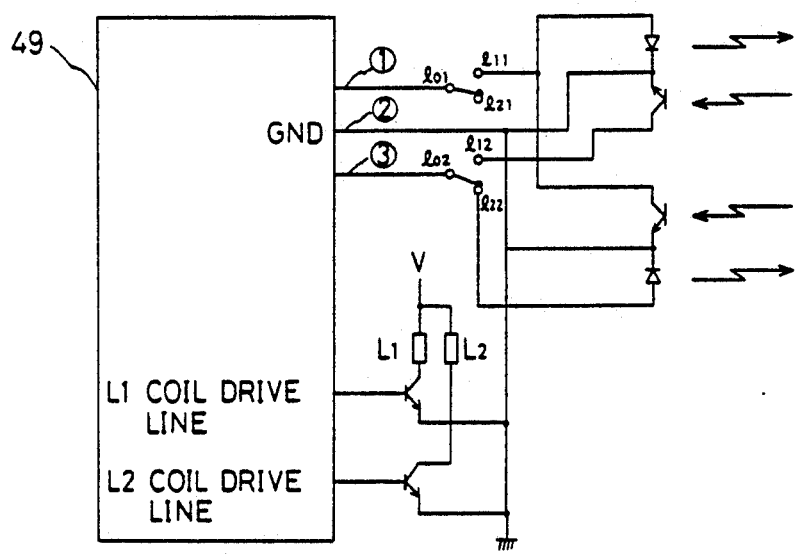
FIG. 25
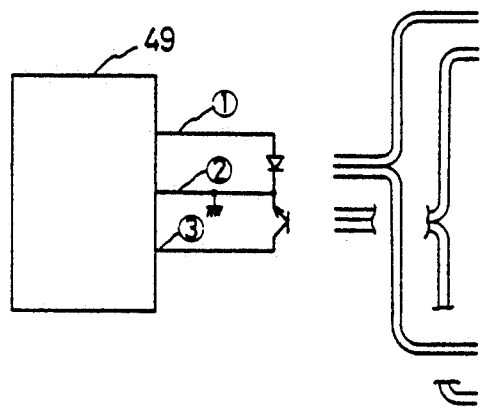
FIG. 26

DATA PROCESSOR WITH WIRELESS AUXILIARY INPUT APPARATUS

BACKGROUND OF THE INVENTION

1. Field of the Invention

The present invention relates to a data processor, such as a word processor, personal computer, etc., and particularly to a data processor which includes as an extra an auxiliary input device for inputting information in a wireless system, as well as an input device built in to the main machine thereof.

2. Description of the Prior Art

Conventionally, for example, in a wireless remote controller for a TV or VTR set, a transmitting device is generally installed in a front face of the remote controller while a receiving device is installed in a front face of a main machine of the remote controller, and communications of wireless signals are performed between those devices. Such a wireless signal communication system is also utilized int he field of data processing devices; for example, Japanese Unexamined Patent Publication No. SHO/61-9717 discloses a control system for an electronic device, in which the electronic device has such a structure that remote control is carried out by means of a wireless keyboard. Also, Japanese Unexamined Patent Publication No. SHO/62-168218 discloses a detachable keyboard which can be divided into two or more keyboard units, each of which can transmit wireless signals.

Japanese Unexamined Patent Publication No. SHO/61-103229 discloses a wireless connection system consisting of a keyboard unit and a main machine, and Japanese Unexamined Publication No. SHO/61-103230 discloses a wireless key input system in which ultrasonic wave is generated as required.

These kinds of systems have as their goal a wireless connection between a keyboard and a main machine without cable, and such an arrangement is similar to the ordinary one except for the cable.

However, in the above-mentioned wireless keyboard, deviation from a correct orientation of a remote controller (wireless keyboard) in an input operation hinders the wireless keyboard from transmitting/receiving wireless signals to and from the main machine, and therefore, the keyboard must always be oriented to a receiver during the operation. This means the wireless keyboard must always be used on a desk, and so, remote control which is an advantage of a wireless system is not fully utilized. Another cause of such a disadvantage is that there is only one light emitting device serving as a transmitter for data communication.

SUMMARY OF THE INVENTION

The present invention is invented allowing for the above-mentioned situations, and it provides a data processor in which a wireless auxiliary input device can transmit/receive wireless signals in either state where it lies on a desk or it is held by hand, so that the operational range of the auxiliary input apparatus is enlarged.

The present invention provides a data processor comprising: a main unit including a box type unit, a keyboard, a folding display, a receiver for wireless signals on an external side wall close to a supporter for pivotally supporting the folding display and an auxiliary input apparatus including a case unit formed so as to be juxtaposed with the keyboard or held in the palm, a transmitter for wireless signals in a corner of the case unit corresponding to a position opposed to the receiver of the main unit, whereby the auxiliary input apparatus transmitting/receiving wireless signals in either state where it is juxtaposed with the keyboard or held in the palm.

In the present invention, wireless signals include infrared rays signals, radio signals, ultrasonic wave signals, and other aerial propagation signals. With ten keys and specific edit keys provided in the auxiliary input apparatus, the operator can input data or apply edit commands on the auxiliary input apparatus, and thereby, there is no need for the operator to always seat himself in front of the main unit of the data processor, so that dissatisfaction in operating the processor can be considerably reduced.

According to the present invention, operating the auxiliary input device juxtaposed with the keyboard side by side, communication of wireless signals with the main unit can be attained in such a state, and moreover, operating the auxiliary input device held in the palm, communication of wireless signals with the main unit can be attained through remote control.

In another aspect of the present invention, operation of the auxiliary input device can be performed without regard to the orientation of a signal generator, and both control at close range to the main unit and remote control can be performed. Since the auxiliary input device is available set in either side of the keyboard, operability is enhanced, and since no restriction is placed upon an arrangement of the main body and the auxiliary input device, they can be disposed in any way. With more than two input apparatus which function differently, different kinds of data can be easily input. Moreover, since ten keys are systematically configured so as to be used independently of the main body of the word processor, calculation can be performed while a document is edited, and pressing a button enables the result of the calculation to be presented on a word processor edit screen.

DESCRIPTION OF THE DRAWINGS

An embodiment of the invention will now be described by way of example and with reference to the accompanying drawings, in which:

FIG. 2 is a diagram showing an arrangement of keys in a cordless key unit in an embodiment according to the present invention;

FIG. 3 is a diagram showing an arrangement of keys which are operable when used together with function keys in FIG. 2;

FIG. 8 is a diagram showing a key code table of the cordless key unit in the embodiment;

FIG. 15 is a diagram showing an appearance of a light receiver in a third embodiment according to the present invention;

FIG. 16 is a circuit diagram showing the light receiver shown in FIG. 15;

FIG. 17 is a diagram showing an appearance of a light receiver in a fourth embodiment according to the present invention;

FIG. 20 is a diagram showing an appearance of another structure of a cordless key unit in the embodiment;

FIGS. 21(a) and 21(b) are diagrams showing an arrangement of keys in the cordless key unit shown in FIG. 20;

FIG. 23 is a circuit diagram in the case where a light receiver having a transmitter/receiver feature is incorporated;

FIG. 24 is a diagram showing an inner structure of a remote control transmitting/;receiving unit in FIG. 23;

FIG. 25 is a corresponding diagram of a transmitting/receiving system to FIG. 16;

FIG. 26 is a corresponding diagram of a transmitting/receiving system to FIG. 17.

DESCRIPTION OF THE PREFERRED EMBODIMENTS

Figure 1:
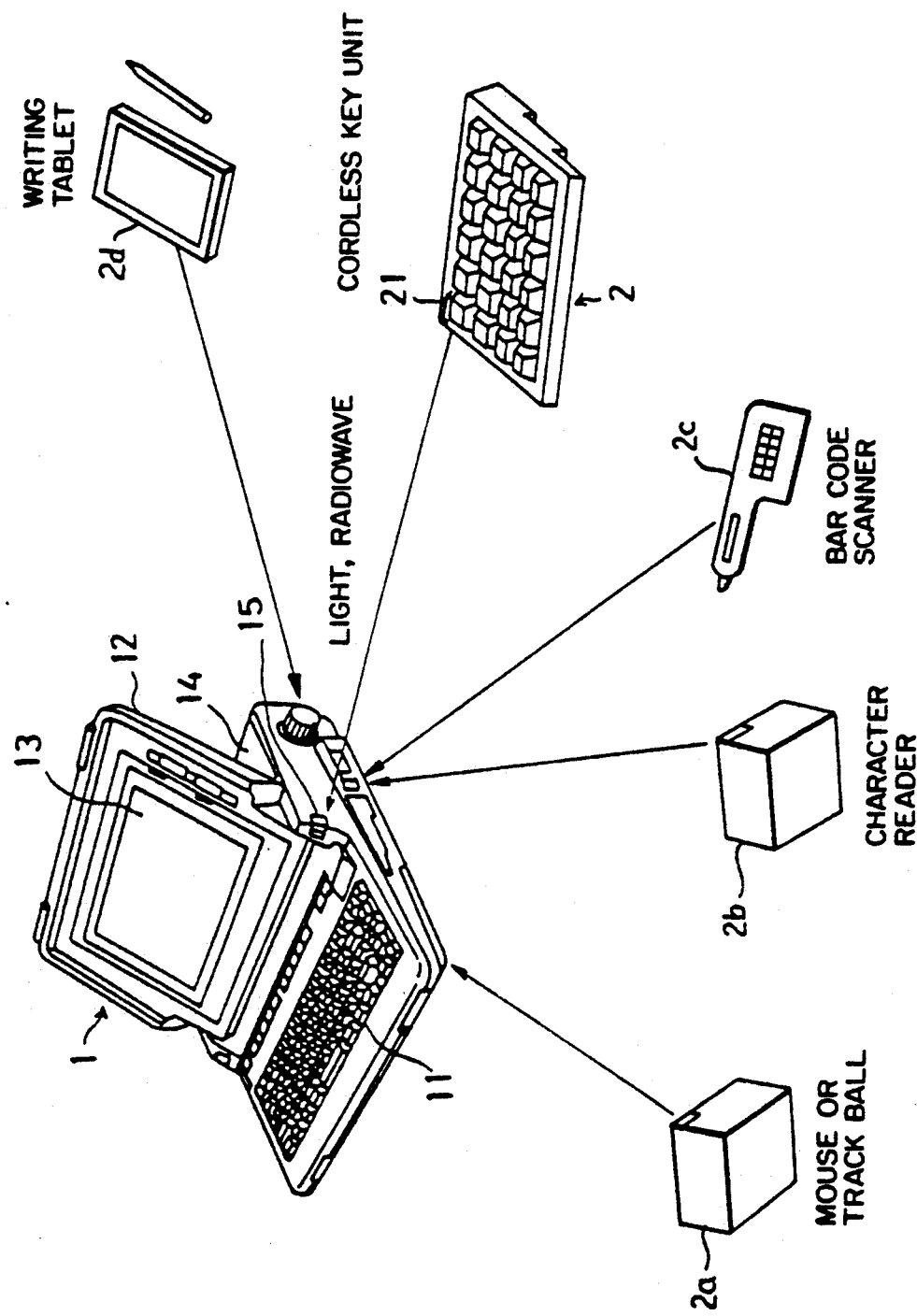
FIG. 1 is a perspective view showing an appearance of a data processor according to the present invention.

FIG. 1 is a diagram showing an appearance of the invention applied to a word processor. Reference numeral 1 denotes a main unit of a laptop type word processor, and numeral 2 denotes a cordless key unit serving as an auxiliary input apparatus. Additional cordless units 2a to 2d will be discussed below. The main unit 1 is provided with a keyboard 11 at its front, a liquid crystal display 13 in a folding top 12, and a printer 14 at its back. Reference numeral 15 designates a receiver of wireless signals, which is positioned at an outer wall on a side of a cabinet of the main unit, where the top 12 is pivotally fixed. Although the keyboard 11 includes an arrangement of keys similar to that in a conventional laptop type word processor, an area for the keyboard is restricted as is the common case in word processors of this kind, and so, there are no independent ten keys.

The cordless key unit 2, which is formed in a case unit and is sized so that it can be held in the palm, can be used juxtaposed with the keyboard 11 on the right of it. The cordless key unit 2 is provided with a transmitter 21 for the wireless signals at the corner of the case unit (the left corner) which is opposed to the receiver 15 of the main unit 1 when the cordless key unit 2 is juxtaposed with the keyboard 11. Thus, the system is designed so that the transmitter 21 and the receiver 15 are opposed to each other when the cordless key unit 2 is juxtaposed with the keyboard 11 on its right side.

FIG. 2 shows an arrangement of keys of the cordless key unit 2, and FIG. 3 shows keys operable together with function keys (through switching by pressing the function keys), separated from FIG. 2 for easier recognition. Labels on the keys on FIG. 3 are represented in a different color or colors form labels on the keys in FIG. 2, on top surfaces or side faces of corresponding keys. Thus, operation on the cordless key unit 2 makes the following functions executable; for example, ten keys input and four basic operations of arithmetic, major edit functions such as moving, copying, deleting, backspacing, jump to the top of document, jump to the end of document, returning, page breaking, underlining, spacing, space inserting, changing to double-wide characters, changing to half-wide characters, changing to full-wide characters, line ruling, formatting, region specifying, cursor moving, etc., and releasing and executing various commands. The arrangement of the keys are not limited to that which has been mentioned above, and the operator can selected desired keys for registration.

Figure 4:
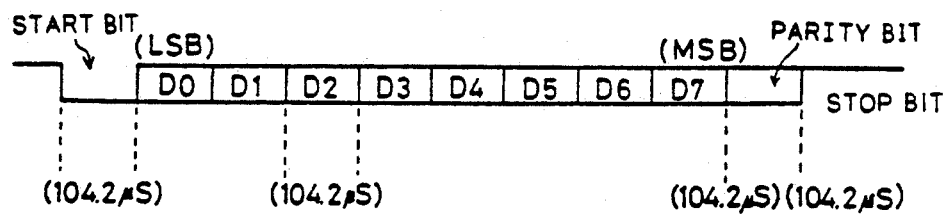
FIG. 4 is a diagram showing a structure of data transmitted from the cordless key unit in the embodiment.

FIG. 4 shows a structure of data to be transmitted from the cordless key unit 2 to the main unit 1. Transmission of the data begins with the least significant bit (LSB), and a start bit "0", a stop bit "1", and a parity bit "odd parity (to output "0" or "1" so that the sum of "1"s is odd with the parity bit included)" are preset.

Figure 5:
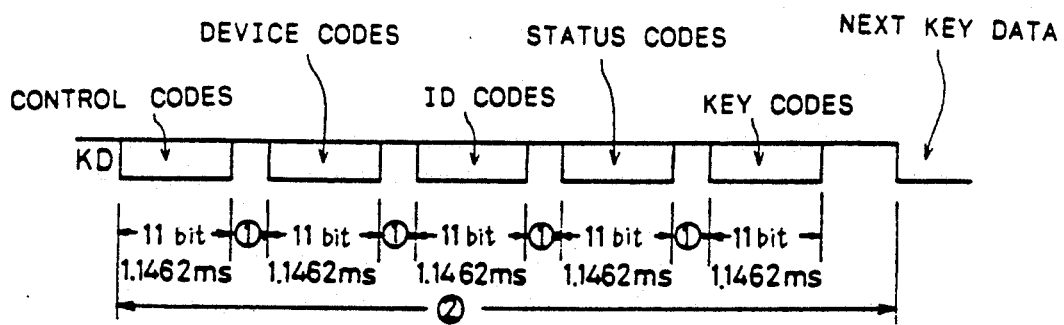
FIG. 5 is a diagram showing an order of transmission of the data to be transmitted in FIG. 4.

FIG. 5 shows an order of the transmitted data. In FIG. 5, ① indicates a waiting time 104.2 uS across a data block (11 bit), ② indicates a waiting time 20 mS or more until the next key data.

Figure 6:
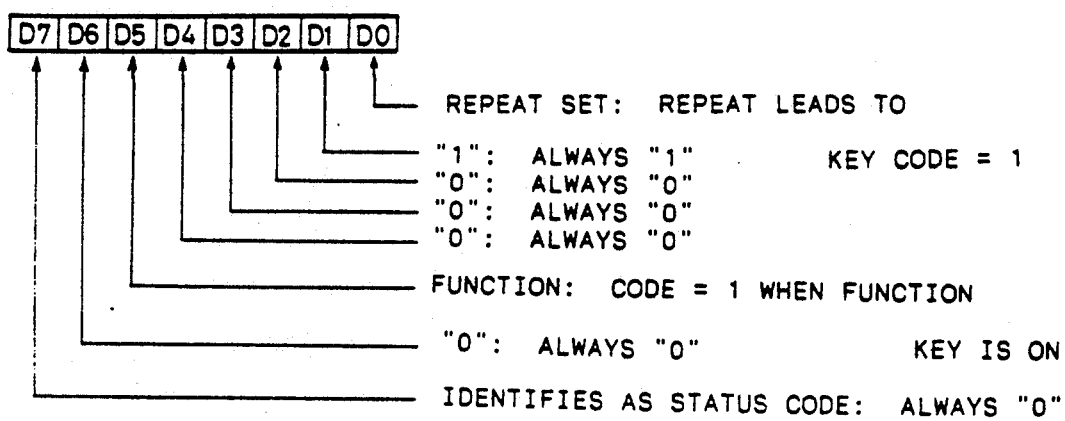
FIG. 6 is a diagram showing a bit structure of status codes shown in FIG. 5.
Figure 7:
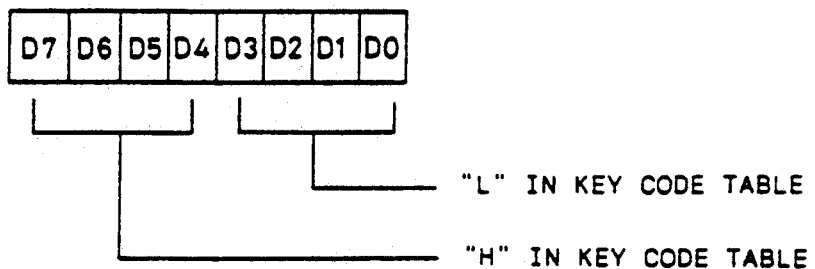
FIG. 7 is a diagram showing a structure of a key code shown in FIG. 6.

FIG. 6 shows a bit structure of status codes in FIG. 5. Pressing a function key, a bit of D5 turns to "1", and code information about a key corresponding to an edit function which is pressed simultaneously with the function key is transmitted to the main unit 1 of the word processor as shown FIG. 7 in the total 5 byte code of information as shown in FIG. 5. Then, the 5 byte code of information transmitted to the main unit 1 is transferred to an optical signal controller by a light/electricity converter mentioned later, and furthermore, after operationally processed in a microprocessor, the information is transformed into the intended edit function (that which has been specified on the cordless key unit) and used for editing document data.

FIG. 8 shows a key code table, where "H" corresponds to the high-order 4 bit D4 to D7, and "L" corresponds to the low-order 4 bit D0 to D3. Thus, the keys in the cordless key unit 2 are expressed in matrix.

Figure 9:
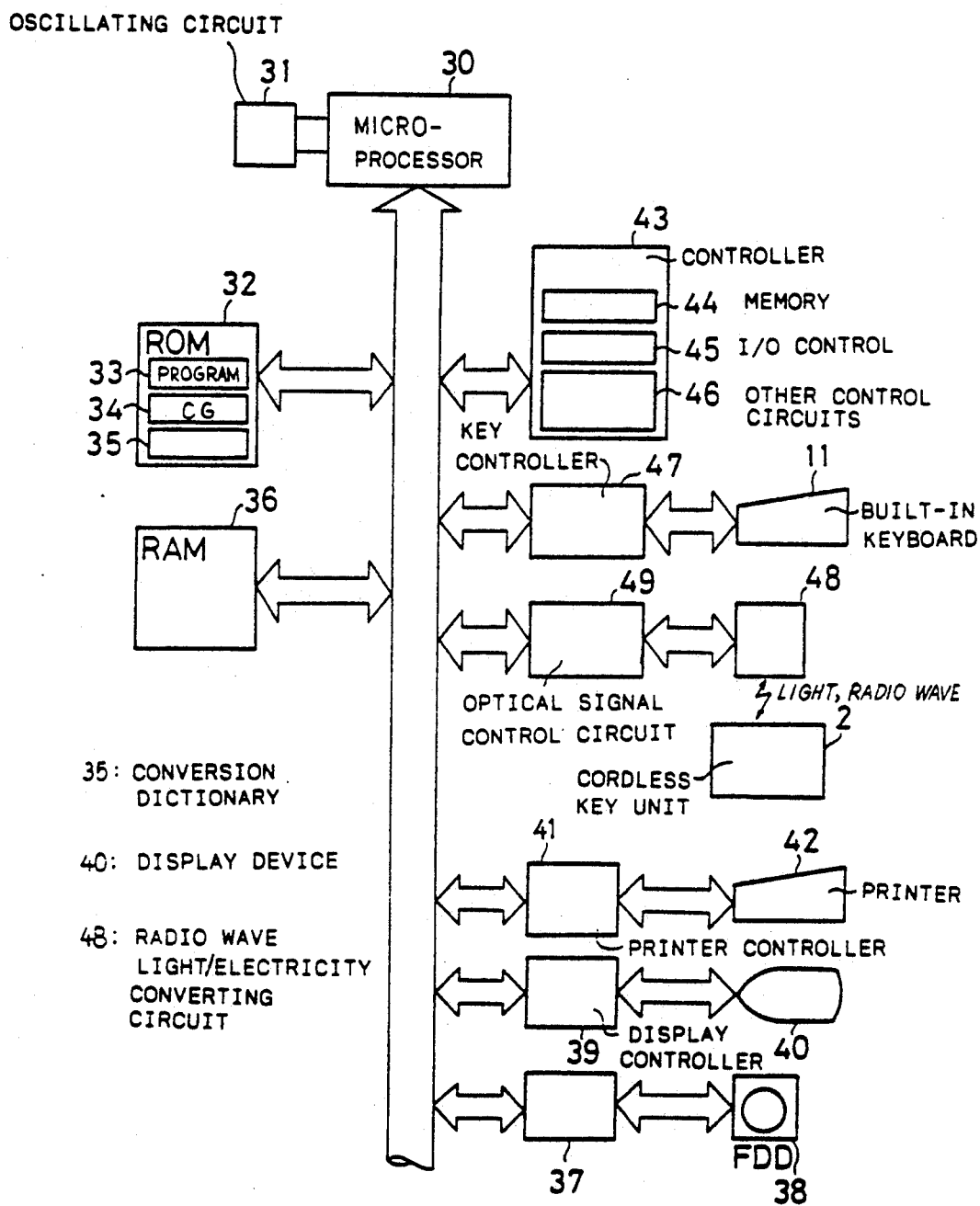
FIG. 9 is a block diagram showing a structure of a main unit in the embodiment.
Figure 10:
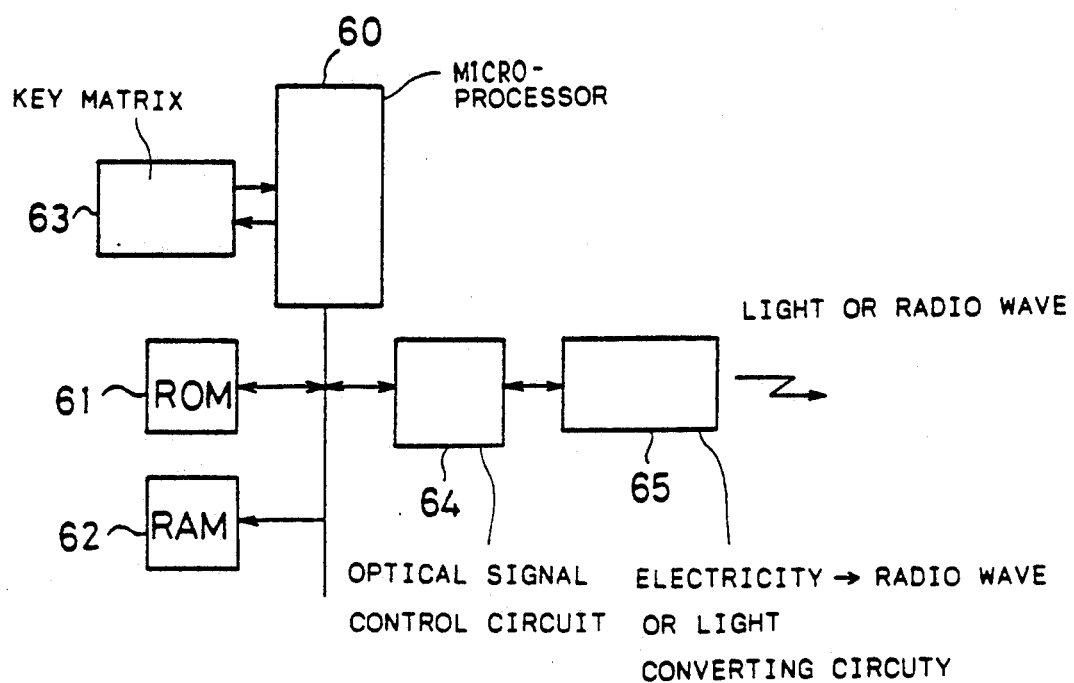
FIG. 10 is a block diagram showing a structure of the cordless key unit in the embodiment.

FIG. 9 is a block diagram showing a configuration of the main unit 1 of the word processor. FIG. 10 is a block diagram showing a configuration of the cordless key unit 2.

In FIG. 9, reference numeral 30 denotes a microprocessor consisting of a CPU which synthetically controls the operation in the main unit. Numeral 31 designates an oscillating circuit which produces a basic clock of the main unit to supply it to the CPU. A ROM 32 stores an operation program 33 for the main unit, a character generator (CG) 34, a conversion dictionary 35, etc., and supports the CPU in operation. A RAM 36 stores document data, control information, etc. made in the word processor, and similarly supports the CPU in operation. A floppy disk controller (FDC) 37 connects a floppy disk (not shown) as input to the main unit 1 through a floppy disk drive (FDD) 38.

A display controller 39 controls a display device 40 about an display therein. In the preferred embodiment, the display device consists of a liquid crystal display apparatus. A printer controller 41 controls an printing operation of a printer 42. A controller 43 consisting of a memory 44, an I/O control 45, and other control circuits 46 administrates the memory 44 on data writing/reading and also administrates control signals for connecting I/O and the like.

Key input in this embodiment is connected to a key controller 47 as to the key board 11 while it is connected to the CPU through the light signal control 49 and a radio wave, light to electricity converting circuit 48 as to the cordless key unit 2.

In the cordless key unit 2 shown in FIG. 10, a microprocessor 60 consisting of the CPU controls the whole of the cordless key unit 2. A ROM 61 stores a control program for the cordless key unit 2. A RAM 62 helps an execution of the program. Keys on the cordless key unit are included in a key matrix 63, and their arrangement is shown in FIGS. 2 and 3. Key input signals generated from the key matrix 63 are converted into wireless signals through an electricity to radio wave/light converting circuit 65 and further transmitted to the main unit 1 through aerial propagation.

Figure 11:
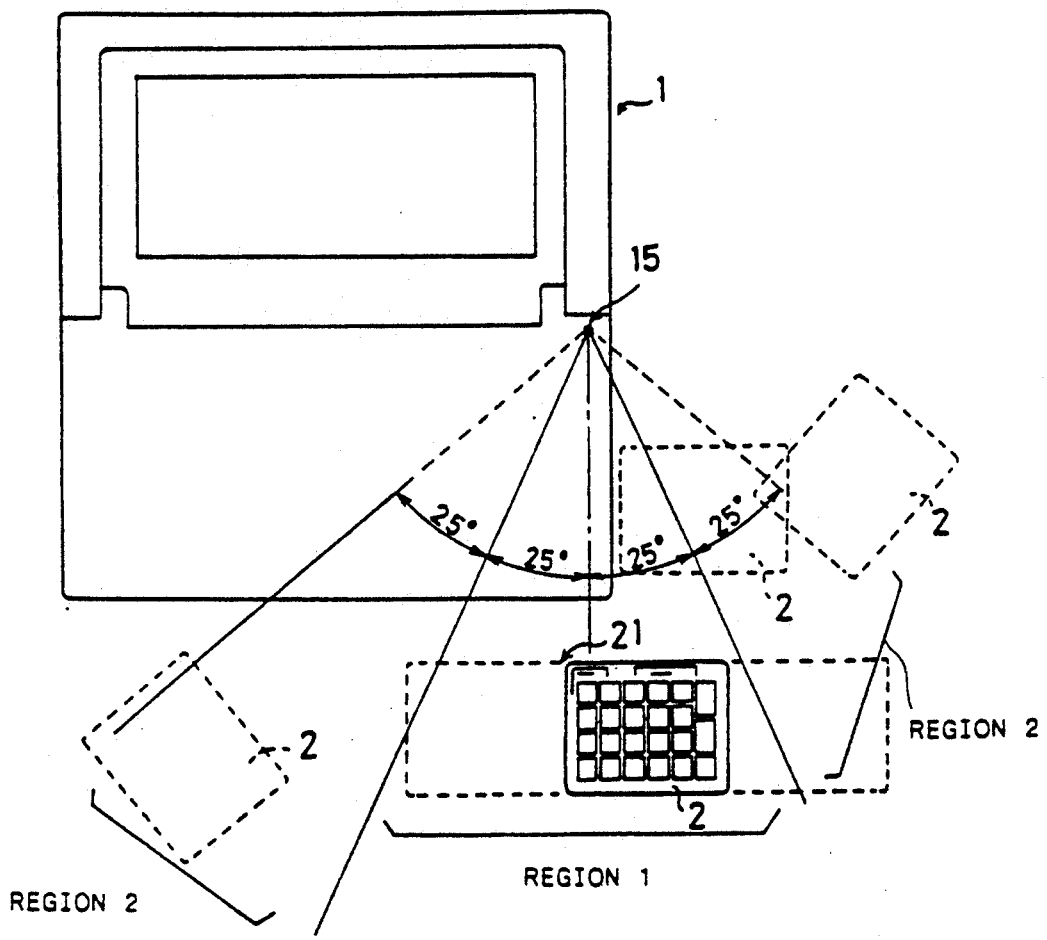
FIG. 11 is a plan view showing an available range of the cordless key unit in the embodiment.
Figure 12:
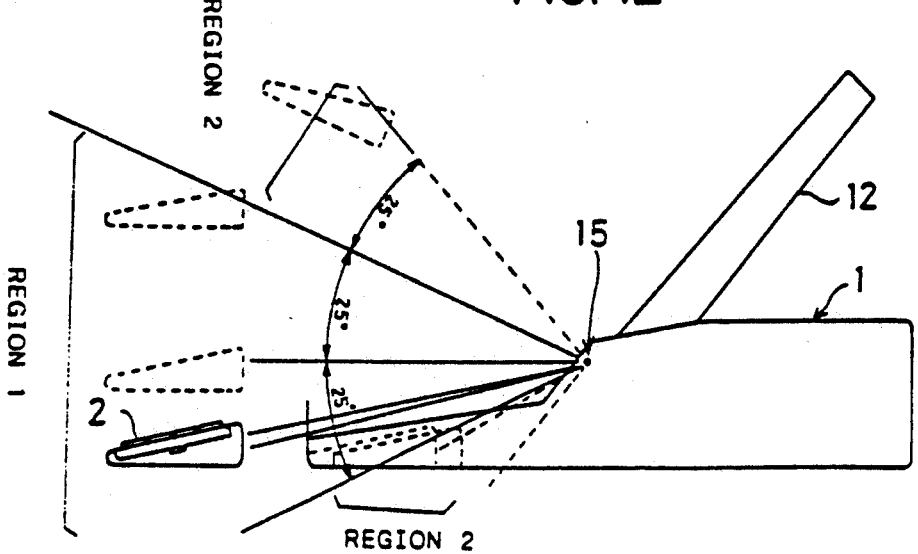
FIG. 12 is a side view showing the available range of the cordless key unit in the embodiment.

FIG. 11 is a plan view showing a position relation between the main unit 1 and the cordless key unit 2 and an available range for transmitting/receiving wireless signals. FIG. 12 is a side view showing an available range for transmitting/receiving them.

A region 1 shown in FIG. 11 is the one where the cordless key unit is available without regard to the orientation of the transmitter 21, and a region 2 is the one where the cordless key unit is available if the transmitter 21 is oriented to the receiver 15 of the main unit 1.

Figure 13:
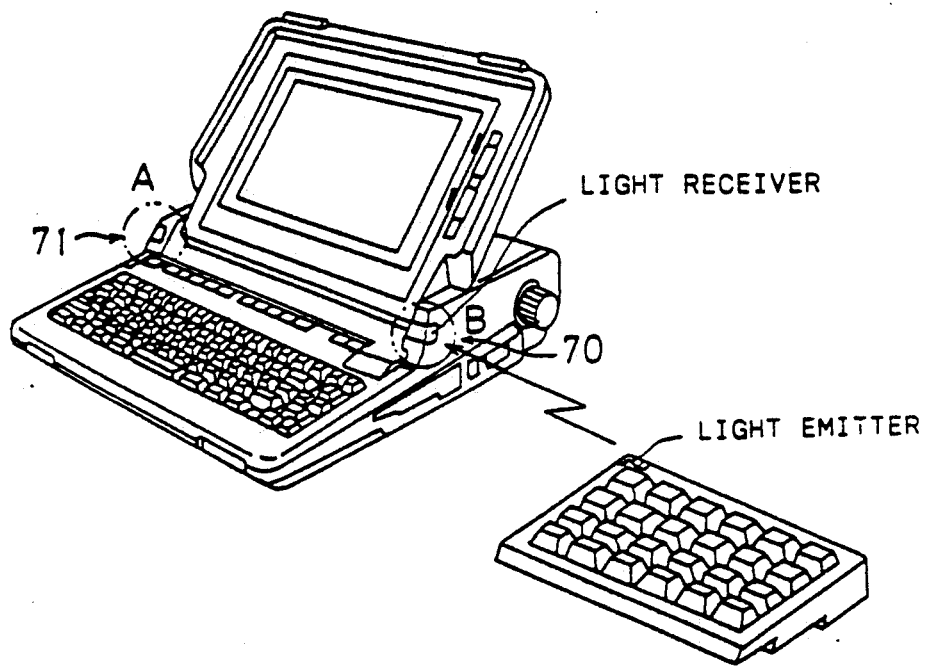
FIGS 13(a) and 13(b) are diagrams showing an appearance of a replaceable light receiver in a second embodiment according to the present invention.
Figure 14:
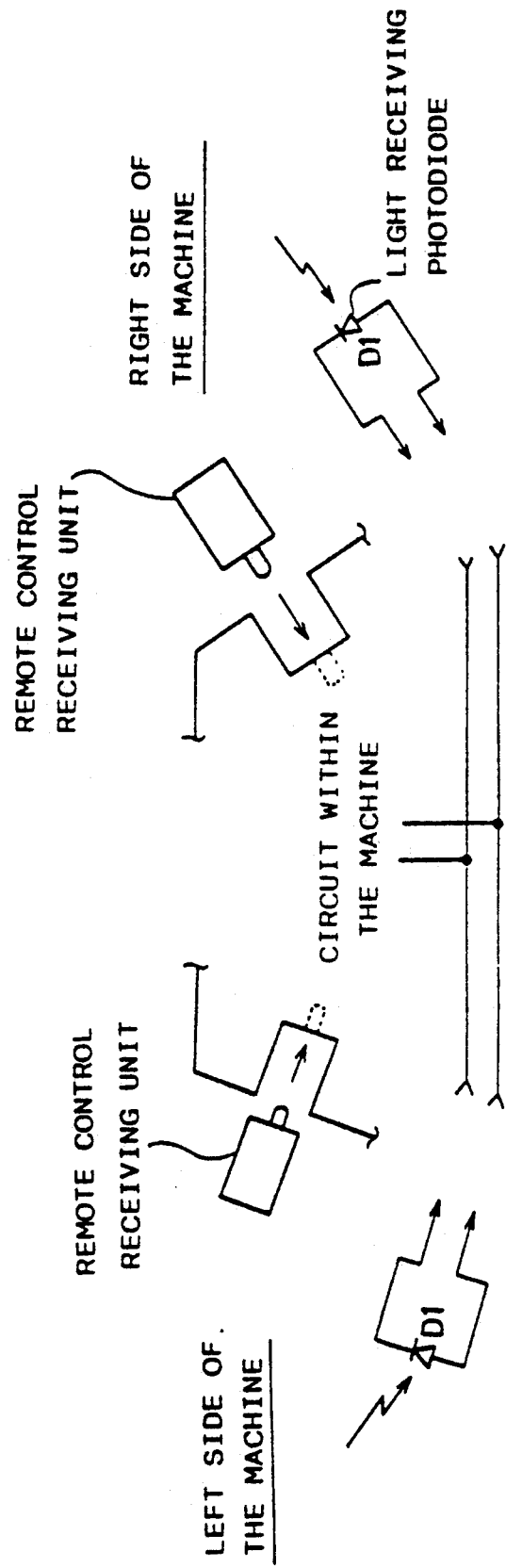
FIG. 14 is a circuit diagram showing the replaceable light receiver shown in FIG. 13.

FIGS. 13(a) and 13(b) show a word processor which has a receiver of a unit commutative system, and FIG. 14 is a circuit diagram thereof. In both the drawings, a receiving unit 72 for wireless signals is detachably fixed to opposite sides 70 and 71 of the main unit 1 of the word processor, and a receiving unit 72 which is fixed in either of the sides of the main unit as required is connected to circuitry of the main unit. Reference character D1 in FIG. 14 denotes a light receiving photodiode.

The receiving unit 72 has the radio wave/light to electricity converting circuit 48 within it, which converts wireless signals transmitted form the cordless key unit 2 into electric signals, and then, such converted signals are transmitted through the light signals controller 49 to the microprocessor 30 (see FIG. 9).

It is preferable that a dummy receiving unit is attached to the side not used, in order to make an appearance of the main unit neat.

FIG. 15 shows a word processor which has a main unit provided with receivers at opposite sides thereof, and FIG. 16 shows a circuit diagram thereof, which is within the machine. Both the receivers consist of two photodiodes D3 and D4, as shown in FIG. 16, and are connected through a relay contact 75 to circuitry of the main unit. The operator may determine which photodiode on the left or right should be activated, through the CPU or by directly inputting a control signal for switching the relay.

FIG. 17 shows an optical path distributing system of the receivers. Utilizing optical fibers 76 to make optical paths from both the receivers on the opposite sides of the main unit of the word processor to a photodiode D7 serving as a sensor, a single sensor can implement wireless signal receiving from the opposite directions.

As shown in FIG. 1, there may be more than one of such cordless key unit as mentioned above, including an image scanner 2b, a mouse or a track ball 2c, hand-writing table input apparatus 2d, a barcode reader 2c, etc. For the case where a plurality of cordless key units are incorporated, a single receiver is sufficient.

Figure 18:
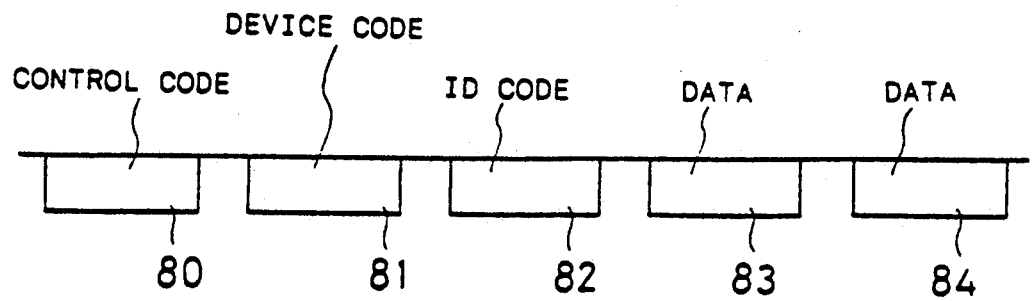
FIG. 18 is a diagram showing a structure of transmitted data in the embodiment.

When a variety of wireless input apparatus as mentioned above are employed, data transmitted form each of those input apparatus has a structure shown in FIG. 18. Specifically, the transmitted data consists of a control code 80, a device code 81, an ID code 82, and data 83, 84, and one code group is structured in 8 to 11 bit.

The control code 80 is a code which expresses the beginning of transmission, and is designated by 01H, for example. The device code 81 is a code which is allocated to input equipments having various functions, and is designated by 07H in the case of a ten key unit, for example. The ID code 82 is an identification number applied to the individual input equipments, designated by 00H to 99H, for example, and the main unit 1 of the word processor can identify the plurality of input equipments in accordance with the ID code 82. The data codes 83 and 84 are data which are carried by various devices, and they include more than two data groups which vary from device to device.

Figure 19:
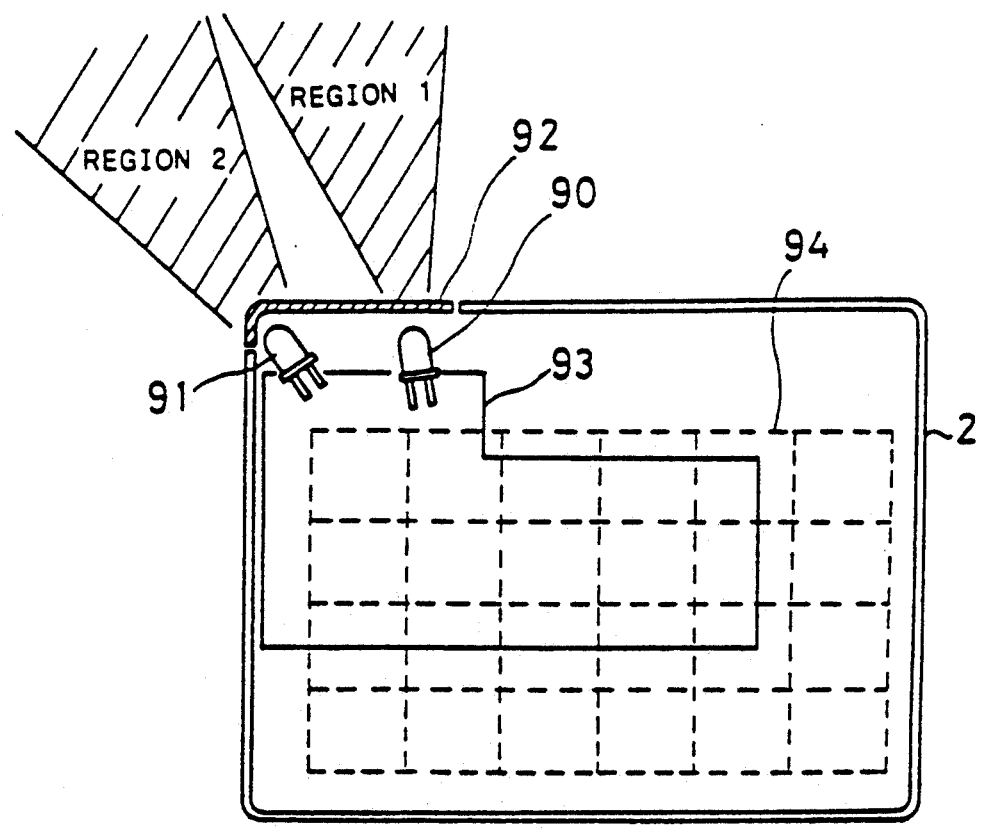
FIG. 19 is a diagram showing another structure of a transmitter in the embodiment.

FIGS. 19 and 20 show another embodiment of the cordless key unit, where a transmitter consists of a plurality of light emitting elements. In these figures, reference numerals 90, 91 denote light emitting elements; the light emitting element 90 covers a region 1 as available for operation while the light emitting element 91 covers a region 2, and hence, a region available for operation by the light emitting element 91 range form the region 1 to the region 2. Reference numerals 92, 93 and 94 designate a filter, circuit board, and a key top unit, respectively.

Figure 22:
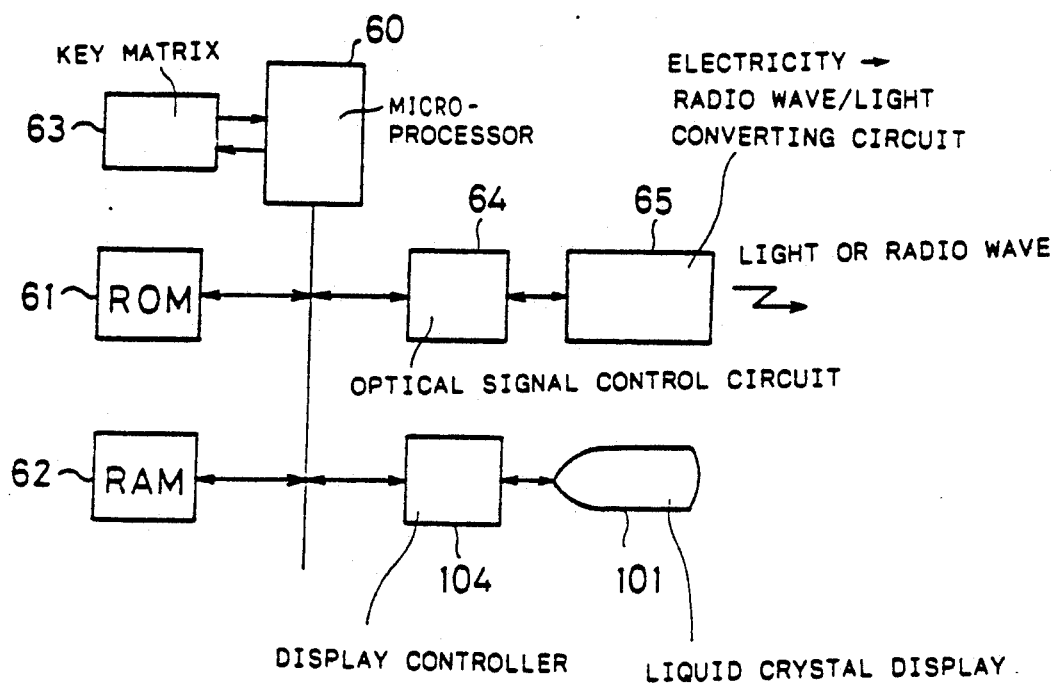
FIG. 22 is a circuit diagram showing the cordless key unit shown in FIG. 20.

FIG. 20 shows an appearance of the word processor where the cordless key unit has an operational function and can display operation results. FIGS. 21(a) and 21(b) are plan views showing a liquid crystal display 101 in a cordless key unit 100 and a key arrangement; FIG. 21(a) shows an arrangement of keys used for an ordinary operation while FIG. 21(b) shows an arrangement of keys used together with function keys, separated from the arrangement in FIG. 21(a). Reference numeral 102 denotes a switch key and 103 denotes a transmit key. FIG. 22 shows a system architecture of the cordless key unit, where a reference numeral 104 denotes a display controller. In FIG. 22, like reference numerals designates corresponding components in FIG. 10, and therefore, explanation about them is omitted.

The cordless key unit can be operated in the following way. As shown in FIGS. 21(a), 21(b) and 22, pressing the switch key 102, the cordless key unit is switched between two operation modes, namely, a sequential transmission mode and a block transmission.

In the sequential transmission mode, the main unit sequentially receives data corresponding to the key which is pressed. Thus, the cordless key unit can be used as ordinary ten keys. On the other hand, in the block transmission mode, use of a ten keys unit is enough for operational processing, and the ten key unit can be used as a portable calculator. Operation results are presented on a liquid crystal display 101, and pressing the transmit key 103, data displayed on the liquid crystal display 101 like the operation results can be transmitted to a position which is marked by a cursor on a screen of the main unit 1 of the word processor.

Then, still another embodiment in which signals can be transmitted from the main unit 1 to the cordless key unit 2 will be described below.

FIG. 23 is a circuit diagram of a receiver, including a line 1 for light emitting diode drive signal, a line 2 for grounding, and a line 3 for a phototransistor collector. FIG. 24 shows an inner structure of a remote controller transmitting/receiving unit, which includes a light emitting diode and a phototransistor. FIG. 25 shows a switch circuit for two photodiodes, corresponding to FIG. 16. In FIG. 25, if a signal is output from an L1 coil drive line to turn a coil L1 on, switches 101 and 111, and 102 and 112 are accordingly turned on, respectively, and one of the transmitting/receiving units of the main unit 1 becomes available. If a signal is output from an L2 coil drive line to turn a coil L2 on, switches 102 and 112, and 102 and 122 are accordingly turned on, respectively, the other of the transmitting/receiving units of the main unit 1 becomes available.

FIG. 26 shows an optical path distributing system of the light receiving unit, which corresponds to FIG. 17.

Figure 27:
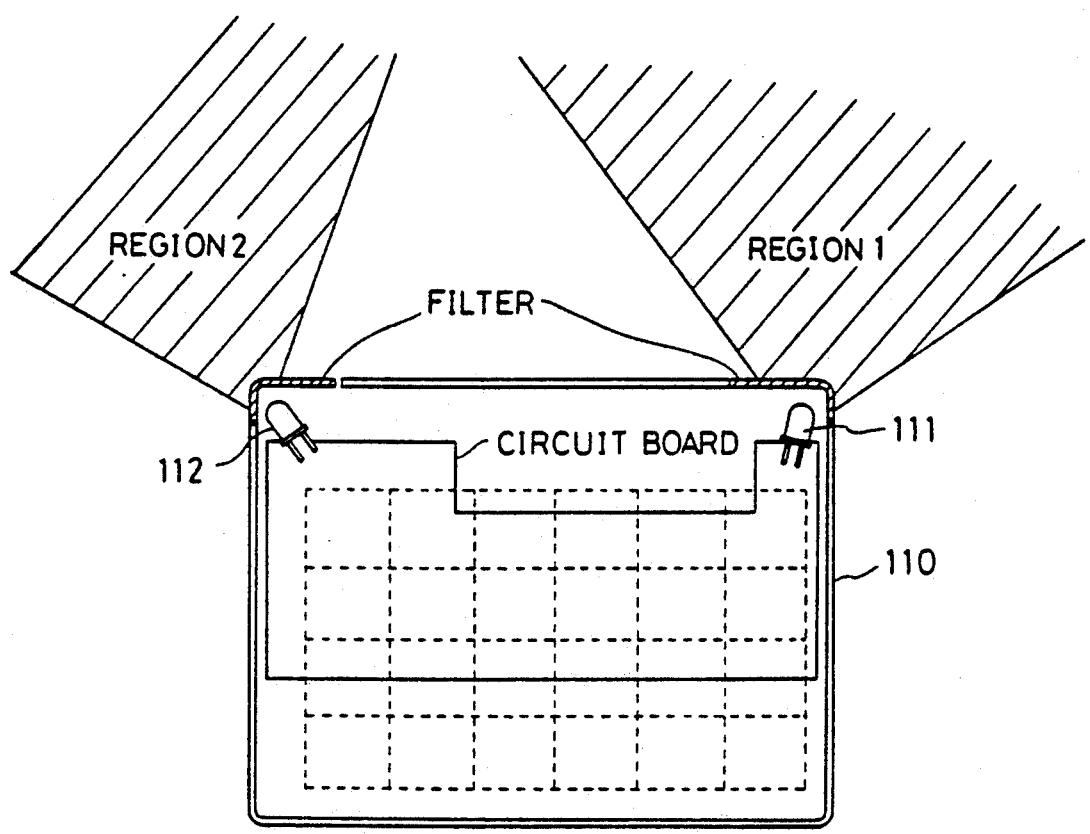
FIG. 27 is a corresponding diagram of a variation of the cordless key unit to FIG. 19.

FIG. 27 shows a still another embodiment of the cordless key unit shown in FIG. 19, where light emitting elements are provided on the left and right of the cordless key unit 110 so that a region available for operation can be further enlarged. In such a configuration, for example, even holding a light emitting element 112 shielded by the left hand, key input to the cordless key unit can be performed by the right hand alone.

What is claimed:

1. A data processor system comprising:
a main unit and an auxiliary input apparatus,
the auxiliary input apparatus including signal generating mean for generating wireless signals, a first transmitting means for transmitting the generated signals in one direction outward from the auxiliary input apparatus, and a second transmitting means for transmitting the generated signals in another direction outward from the auxiliary input apparatus,
the main unit including data processing means, a keyboard, a display and a wireless signal receiving means operatively connected with the data processing means together with the keyboard and the display,
the wireless signal receiving means being divided into a first segment positioned on the main unit for receiving the wireless signals from the first transmitting means and a second segment positioned on the main unit for receiving the wireless signals from the second transmitting means.

2. A data processor system of claim 1, in which the main unit further comprises selecting means for selectively allowing the first or second segment to receive the wireless signals.

3. A data processor system of claim 1, in which the wireless signals are optically communicated between the main unit and the input apparatus.

4. A data processor system of claim 3, in which the first and the second segments comprise a first and a second optical port, respectively, to receive optical signals from the input apparatus, and the main unit further comprises a light/electricity converter electrically connected with the data processing means and optical fibers for optically connecting the first and second optical ports with the light/electricity converter.

5. A data processor system comprising:
a main unit and an auxiliary input apparatus;
the auxiliary input apparatus including signal generating means for generating wireless signals, a first transmitting means for transmitting the generated signals in one direction outward from the auxiliary input apparatus, and a second transmitting means for transmitting the generated signals in another direction outward from the auxiliary input apparatus;
the main unit including a wireless signal receiving means for receiving wireless data signals, a data processing means, a keyboard, and a display, said data processing means being operatively connected with the keyboard and the display;
the main unit further including first and second data receptive ports in which the wireless signal receiving means is selectively mounted, said main unit further including means for transmitting the data signals from the wireless signal receiving means to the data processing means when the wireless signal receiving means is received in one of the first and second data receptive ports;
thereby providing a wide communications range between the main unit and the auxiliary input means by mounting the wireless signal receiving means in one of the first and second data ports in accordance with the positional relationship between the main unit and the auxiliary input means.

6. A data processor system as defined in claim 5, wherein the main unit further includes a dummy signal receiving means, and when the wireless signal receiving means is mounted in the first data receptive port the dummy signal receiving means is mounted in the second data receptive port.

7. A data processor system as defined in claim 5, wherein the first and second data receptive ports are located on two opposite sides of the main unit adjacent said keyboard.

8. A data processor system as defined in claim 5, wherein the auxiliary input apparatus further includes numeral keys for inputting numeral data, editor keys for instructing edition, a key for switching between the numeral keys and the editor keys, a code switching means for switching between codes from the numeral keys and codes from the editor keys in accordance with the key selection of the key for switching, thereby transmitting ht key codes inputted by the numeral keys and the editor keys in a form of wireless signals,
the main unit further including code processing means for extracting key codes from the wireless signals sent form the auxiliary input apparatus and for discriminating between the numeral codes and the editor codes;
said data processing means processing the wireless signal data based on the numeral codes and the editor codes discriminated.

9. A data processor system as defined in claim 5, wherein the auxiliary input apparatus further includes numeral keys for inputting data, arithmetic means for executing arithmetic operations based on data inputted by the numeral keys, a memory means for storing arithmetic results, and a display means for displaying the arithmetic results visually on the auxiliary input apparatus; and
a selector key on the auxiliary input apparatus for selectively determining if inputted numeral data are transmitted in the form of the numeral data as the wireless signals or the arithmetic results are stored and transmitted as the wireless signals.

10. A data processor system as defined in claim 5, wherein the wireless signals are aerial transmission signals comprising infrared signals, wireless radio signals, or ultrasonic signals.

11. A data processor system as defined in claim 5, wherein the auxiliary input apparatus comprising a wireless input apparatus which includes an auxiliary keyboard, mouse, track ball, optical character reader, tablet for manual writing, or bar code reader, and the auxiliary input apparatus transmits an identification code for self-identification along with the data codes in a form of wireless signals.

12. A data processor system as defined in claim 5, 8 or 11, wherein, in the wireless signal receiving means receiving the wireless signals form the auxiliary input apparatus, the data processing means processes the data based on the code which the code processing means discriminates out of the wireless signals.

* * * * *